United States Patent
Gargiulo et al.

(10) Patent No.: US 12,252,796 B2
(45) Date of Patent: Mar. 18, 2025

(54) ANODE FOR ELECTROLYTIC EVOLUTION OF CHLORINE

(71) Applicant: INDUSTRIE DE NORA S.P.A., Milan (IT)

(72) Inventors: Alice Gargiulo, Milan (IT); Alice Calderara, Milan (IT); Chiara Pezzoni, Rodenbach (DE)

(73) Assignee: INDUSTRIE DE NORA S.P.A., Milan (IT)

( * ) Notice: Subject to any disclaimer, the term of this patent is extended or adjusted under 35 U.S.C. 154(b) by 0 days.

(21) Appl. No.: 15/521,396

(22) PCT Filed: Nov. 23, 2015

(86) PCT No.: PCT/EP2015/077387
§ 371 (c)(1),
(2) Date: Apr. 24, 2017

(87) PCT Pub. No.: WO2016/083319
PCT Pub. Date: Jun. 2, 2016

(65) Prior Publication Data
US 2017/0306512 A1    Oct. 26, 2017

(30) Foreign Application Priority Data
Nov. 24, 2014 (IT) .......................... MI2014A002020

(51) Int. Cl.
| | |
|---|---|
| C25B 11/051 | (2021.01) |
| C02F 1/461 | (2023.01) |
| C02F 101/12 | (2006.01) |
| C25B 1/26 | (2006.01) |
| C25B 11/093 | (2021.01) |

(52) U.S. Cl.
CPC ........ *C25B 11/051* (2021.01); *C02F 1/46109* (2013.01); *C25B 1/26* (2013.01); *C25B 11/093* (2021.01); *C02F 2001/46142* (2013.01); *C02F 2101/12* (2013.01)

(58) Field of Classification Search
CPC ............. C25B 11/0442; C25B 11/0478; C25B 11/0484–11/0494; C25B 11/04–11/097; B01J 23/14; B01J 23/46; B01J 23/468; B01J 23/462
See application file for complete search history.

(56) References Cited

U.S. PATENT DOCUMENTS

| | | | | |
|---|---|---|---|---|
| 4,513,102 A | * | 4/1985 | Hutchings | ................. C25C 7/02 |
| | | | | 502/101 |
| 4,626,334 A | * | 12/1986 | Ohe | .................... C25B 11/0484 |
| | | | | 204/290.12 |
| 5,334,293 A | * | 8/1994 | Cairns | ................ C25B 11/0484 |
| | | | | 204/290.09 |
| 5,868,913 A | | 2/1999 | Hodgson | |
| 8,366,890 B2 | * | 2/2013 | Urgeghe | ................... C25B 1/46 |
| | | | | 427/126.3 |
| 2013/0186750 A1 | * | 7/2013 | Urgeghe | ............. C25B 11/0484 |
| | | | | 204/242 |

FOREIGN PATENT DOCUMENTS

| | | | | |
|---|---|---|---|---|
| CN | 1888141 A | | 1/2007 | |
| EP | 0153586 A1 | * | 9/1985 | ......... C25B 11/0484 |
| JP | S59190381 A | | 10/1984 | |
| JP | S60162787 A | | 8/1985 | |
| JP | 2013543933 A | | 12/2013 | |
| JP | 2014505166 A | | 2/2014 | |
| JP | 2014159027 A | | 9/2014 | |
| WO | 9505498 A1 | | 2/1995 | |
| WO | 2005014885 A1 | | 2/2005 | |
| WO | 2012069653 A1 | | 5/2012 | |
| WO | 2012085095 A2 | | 6/2012 | |

OTHER PUBLICATIONS

International Search Report and Written Opinion for International Application No. PCT/EP2015/077387 ( 9 Pages) (Mar. 3, 2016).
International Preliminary Report on Patentability for International Application No. PCT/EP2015/077387( 6 Pages) (Oct. 27, 2016).
Search Report corresponding to Japanese Patent Application No. 2017-546029 and English Translation, dated Nov. 26, 2019, 15 pages.
Office Action for Corresponding Japanese Patent Application No. 2017-546029 and English Translation, dated Nov. 28, 2019, 10 pages.

* cited by examiner

*Primary Examiner* — Alexander W Keeling
(74) *Attorney, Agent, or Firm* — LUCAS & MERCANTI, LLP

(57) ABSTRACT

An electrode suitable as chlorine-evolving anode in electrolytic cells and a method for obtaining thereof is provided. The electrode has a metal substrate coated with a catalytic composition made of thin layers based on oxides of tin, iridium and ruthenium and combines excellent characteristics of anodic potential and selectivity with respect to the reaction of chlorine evolution without resorting to the use of dopants such as platinum and palladium.

7 Claims, No Drawings

ANODE FOR ELECTROLYTIC EVOLUTION OF CHLORINE

This application is a U.S. national stage of PCT/EP2015/077387 filed on Nov. 23, 2015 which claims the benefit of priority from Italian Patent Application No. MI2014A002020 filed Nov. 24, 2014 the contents of each of which are incorporated herein by reference.

FIELD OF THE INVENTION

The invention relates to an electrode suitable for operation as anode in electrolytic cells, for example as chlorine-evolving anode in chlor-alkali cells.

BACKGROUND OF THE INVENTION

The electrolysis of alkali chloride brines, such as sodium chloride brine for the production of chlorine and caustic soda, can be carried out with anodes based on titanium or other valve metals activated with a superficial layer of ruthenium dioxide ($RuO_2$) which has the property of lowering the overvoltage of the anodic chlorine evolution reaction. A typical formulation of a catalyst for chlorine evolution consists for instance of a mixture of $RuO_2$ and $TiO_2$, with optional addition of $IrO_2$. Such catalyst displays a conveniently reduced but not yet optimal overvoltage under anodic chlorine evolution.

A partial improvement in terms of chlorine overvoltage and thus of process voltage and overall energy consumption is obtainable by adding a certain amount of a second noble metal selected between iridium and platinum to a formulation based on $RuO_2$ mixed with $SnO_2$, for instance as disclosed in EP0153586; however, this and other tin-containing formulations, such as the formulation disclosed in U.S. Pat. No. 4,513,102, present the problem of simultaneously lowering also the overvoltage of the competing oxygen evolution reaction, so that the chlorine produced by the anodic reaction is contaminated with an excessive amount of oxygen. The negative effect of contamination by oxygen, which decreases the efficiency of the subsequent chlorine liquefaction step and hinders its use in some important applications in the field of polymer material industry, is only partially mitigated by the formulation disclosed in WO2005014885, which teaches an addition of critical amounts of palladium and niobium. Especially at high current densities, indicatively exceeding 3 $kA/m^2$, the purity level of product chlorine is still far from the minimum target required by the industry. A partial improvement of performances is obtainable by applying an alternation of layers having different catalytic compositions onto a metal substrate, namely one layer containing oxides of tin and one layer containing oxides of titanium, for example as disclosed in WO2012069653, in the name of the applicant.

SUMMARY OF THE INVENTION

Various aspects of the invention are set out in the accompanying claims.

Under one aspect, the invention relates to an electrode for evolution of gaseous products in electrolytic cells, for example suitable for evolution of chlorine in electrolysis cells of alkali brines, consisting of a metal substrate equipped with a catalytic coating consisting of a mixture of oxides containing 55-70% by weight of tin, 5-20% by weight of iridium and 20-40% by weight of ruthenium referred to the metals, said catalytic coating being made up of layers of average thickness ranging between 0.1 and 0.4 µm (micrometres), said catalytic coating having an overall noble metal loading expressed as the sum of iridium and ruthenium referred to the metals ranging between 2 and 25 $g/m^2$.

The loading of noble metal is defined as grams of noble metal deposited on a square metre of projected surface.

The average thickness of the layers constituting the catalytic coating hereinbefore described is defined as the average thickness of the catalytic coating divided by the number of layers constituting said coating.

The average thickness of the catalytic coating is obtained by calculating the arithmetic mean of the local thickness of said coating, measured randomly on at least 6 portions of the electrode, each portion having a 20 mm width. The measurement is performed using a scanning electron microscope with Everhart-Thornley detection system used in backscattering mode. The arithmetic mean should be performed on a global data set collecting the measurements performed on all portions, whereby at least 15 random measurements should be performed on each portion, preferably at least 20, excluding the maximum and minimum values retrieved for the same.

The inventors have surprisingly observed that an electrode equipped with a tin-based catalytic coating consisting of layers having the average thickness as hereinbefore described shows unexpectedly improved performances in terms of cell voltage and at the same time of selectivity of $Cl_2$ versus $O_2$ production, moreover displaying a lower time for achieving steady-state performances and reduced electrode wear rate expressed in terms of consumed amount of noble metal per unit of transferred electric charge.

In the context of the present application, the term "tin-based coating" is intended to mean a coating consisting of a mixture of oxides containing at least 50% by weight of tin.

In one embodiment, the layers of the catalytic coating have a noble metal loading, expressed as the sum of iridium and ruthenium referred to the metals, ranging between 0.2 and 1.4 $g/m^2$ per layer.

The inventors have surprisingly observed that an electrode equipped with a tin-based catalytic coating consisting of layers having the average thickness and containing the amount of noble metal per layer as hereinbefore described also shows the unexpectedly improved performances reported above.

In one embodiment, in the electrode according to the invention the total noble metal loading of said catalytic coating expressed as the sum of iridium and ruthenium referred to the metals is comprised between 5 and 12 $g/m^2$.

In one embodiment, the catalytic coating consists of a mixture of oxides of tin, iridium and ruthenium, wherein the Ir/Ru ratio ranges between 0.3 and 0.4 by weight referred to the metals. The inventors have surprisingly observed that providing a lower amount of iridium with respect to ruthenium, in a ratio of approximately 1 to 3 in a tin-based coating, decreases the specific wear rate of the electrode expressed in terms of quantity of noble metal consumed per unit of transferred electric charge, contrary to what can be observed for the catalytic coatings of the prior art wherein the higher the percentage of iridium with respect to the ruthenium, the lower the loss of noble metal per unit of transferred electric charge.

In one embodiment, the catalytic coating consists of a mixture of oxides containing 55-65% by weight of tin, 16-20% by weight of iridium and 20-25% by weight of ruthenium referred to the metals.

Under another aspect, the invention relates to a method for the manufacturing of an electrode comprising the execution of the following sequential steps on a metal substrate:
  a) application of a solution containing the precursors of the components of said catalytic coating to a metal substrate, with subsequent drying at 50-60° C. and thermal decomposition at 450-600° C. until achieving a specific noble metal loading of 0.1 to 1.4 g/m$^2$;
  b) repetition of step a) until obtaining a catalytic coating with a specific noble metal loading of 2 to 25 g/m$^2$;
  c) final heat treatment at 500-550° C. for a time ranging between 50 and 200 minutes.

In one embodiment, the invention relates to a method as hereinbefore described comprising an intermediate heat treatment at 500-550° C. for a time ranging between 50 and 200 minutes carried out upon achieving the deposition of half the total noble metal loading.

The inventors have surprisingly observed that by carrying out an intermediate heat treatment when half the total loading of noble metal is applied as described above, the percentage of O$_2$ in the anodic product is further decreased.

Under a further aspect, the invention relates to an electrolysis cell of alkali chloride solutions comprising an electrode as hereinbefore described as chlorine-evolving anode.

The following examples are included to demonstrate particular embodiments of the invention, whose practicability has been largely verified in the claimed range of values. It should be appreciated by those of skill in the art that the compositions and techniques disclosed in the examples which follow represent compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

EXAMPLE 1

A sample of titanium mesh of 10 cm×10 cm area was rinsed three times in deionised water at 60° C., changing the liquid every time. The rinsing was followed by a 2 hour heat treatment at 350° C. The mesh was then subjected to a treatment in a boiling 20% HCl solution for 30 minutes.

100 ml of an acetic solution containing Ru hydroxyacetochloride complex (hereinafter: RuHAC), Ir hydroxyacetochloride complex (in the following: IrHAC) and Sn hydroxyacetochloride complex (in the following: SnHAC) were then prepared according to the procedure disclosed in WO 2005/014885, with a molar composition of 32% Ru, 8% Ir and 60% Sn.

The solution was applied to the titanium mesh sample by brushing in 14 coats. After each coat, a drying step was carried out at 50-60° C. for about 10 minutes, followed by a 10 minute heat treatment at 500° C. The sample was cooled in air every time before applying the next coat.

The procedure was repeated until reaching a total noble metal loading of 8 g/m$^2$ expressed as the sum of Ir and Ru referred to the metals. A final heat treatment at 500° C. was then carried out for 100 minutes.

The electrode thus obtained was identified as sample #1.

EXAMPLE 2

A sample of titanium mesh of 10 cm×10 cm area was rinsed three times in deionised water at 60° C., changing the liquid every time. The rinsing was followed by a 2 hour heat treatment at 350° C. The mesh was then subjected to a treatment in a boiling 20% HCl solution for 30 minutes.

100 ml of an acetic solution containing RuHAC, IrHAC and SnHAC were then prepared according to the procedure disclosed in WO 2005/014885, with a molar composition of 27% Ru, 10% Ir, 63% Sn.

The solution was applied to the titanium mesh sample by brushing in 12 coats. After each coat, a drying step was carried out at 50-60° C. for about 10 minutes, followed by a 10 minute heat treatment at 500° C. The sample was cooled in air every time before applying the next coat.

The procedure was repeated until reaching a total noble metal loading of 8 g/m$^2$ expressed as the sum of Ir and Ru referred to the metals, carrying out an intermediate heat treatment for 1 hour at 500° C. after applying half the total loading and a final heat treatment at 500° C. for 100 minutes upon reaching the total loading.

The electrode thus obtained was identified as sample #2.

COUNTEREXAMPLE 1

A sample of titanium mesh of 10 cm×10 cm area was rinsed three times in deionised water at 60° C., changing the liquid every time. The rinsing was followed by a 2 hour heat treatment at 350° C. The mesh was then subjected to a treatment in a boiling 20% HCl solution for 30 minutes.

100 ml of a hydroalcoholic solution containing RuCl$_3$*3H$_2$O, H$_2$IrCl$_6$*6H$_2$O, TiCl$_3$ in a solution of isopropanol with a molar composition of 30% Ru, 19% Ir, 51% Ti referred to the metals were then prepared.

The solution was applied to the titanium mesh sample by brushing in 10 coats. After each coat, a drying step was carried out at 35-50° C. for about 5 minutes, followed by a 10 minute heat treatment at 460-470° C. for the first coat and at 480-500° C. for the subsequent coats. The sample was cooled in air every time before applying the next coat.

At the end of the whole process, a total noble metal loading of 8 g/m$^2$ was achieved, expressed as the sum of Ru and Ir referred to the metals.

The electrode thus obtained was identified as sample #C1.

COUNTEREXAMPLE 2

A sample of titanium mesh of 10 cm×10 cm area was rinsed three times in deionised water at 60° C., changing the liquid every time. The rinsing was followed by a 2 hour heat treatment at 350° C. The mesh was then subjected to a treatment in a boiling 20% HCl solution for 30 minutes.

100 ml of a hydroalcoholic solution containing RuCl$_3$.3H$_2$O, H$_2$IrCl$_6$.6H$_2$O and C$_{16}$H$_{30}$O$_4$Sn (stannous 2-ethylhexanoate) having a molar composition of 20% Ru, 10% Ir, 70% Sn were then prepared.

The solution was applied by brushing followed by drying and heat treatment at 500° for 10 minutes. The brushing, drying and heat treatment cycle was repeated four times until obtaining the electrode referred to as sample #C2.

EXAMPLE 3

The samples of the preceding Examples were characterised as anodes for chlorine evolution in a 1 dm$^2$ active area zero-gap laboratory cell fed with a sodium chloride brine at a concentration of 200 g/l and at a temperature of 89° C. with a 32% by weight NaOH catholyte. The following Table shows the cell voltage of the samples measured at a current density of 4 kA/m$^2$ as an indication of their catalytic activity for chlorine evolution and the volume percent of oxygen in product chlorine as an indication of their selectivity. The noble metal wear rate was measured using a laboratory membrane cell with 0.2 dm² anodic active area at 8 kA/m² (accelerated test) after elapsing 4000 and 8000 hours in operation (HOL). The test was carried out with a 210 g/l NaCl anolyte and a 32% by weight NaOH catholyte at a temperature of 89° C. The average layer thickness of the catalytic coating of each sample was calculated according to the designated procedure hereinbefore described. The average thickness of the catalytic coating was measured on the unused samples with a scanning electrode microscope (the commercial SEM/FEG Inspect F 50 by FEI with EDAX microanalysis system), equipped with a Everhart-Thornley detection system used in backscattering mode; the working distance was set at 10 mm, the acceleration voltage at 20 kV, and the magnification ranged between 10000× and 100000×.

Each sample for the cross section measurement was prepared according to the following steps: 6 portions of the sample electrode having a 20 mm width were cut using a precision cutting machine, each portion was embedded in a phenolic hot mounting resin with carbon filler using a press and subsequently polished.

TABLE

| Samples | Cell voltage (V) | $O_2/Cl_2$ (Vol %) | mg/kAh after 7000 HOL | Time to reach steady-state conditions (days) | Average layer thickness (μm) |
|---|---|---|---|---|---|
| 1 | 2.77 | 1.5% | 0.021 | <5 | 0.4 |
| 2 | 2.78 | 1.0% | 0.006 | <5 | 0.3 |
| C1 | 2.90 | 1.4% | 0.025 | 7 | 0.6 |
| C2 | 2.85 | 3% | 0.026 | 7 | 1.3 |

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. An electrode for evolution of gaseous products in electrolytic cells consisting of a metal substrate provided with a catalytic coating made up of layers,
    each layer of said catalytic coating consisting of a mixture of oxides consisting of 55-70% by weight of tin, 5-10% by weight of iridium and 20-40% by weight of ruthenium referred to the metals,
    each layer of the catalytic coating having an average thickness of 0.1 to 0.4 μm,
    said catalytic coating having a total noble metal loading expressed as the sum of iridium and ruthenium referred to the metals of the coating of 2 to 8 g/m²,
    wherein the ratio Ir/Ru is 0.3 to 0.4 by weight referred to the metals of the catalytic coating,
    wherein each layer of said catalytic coating is obtained by applying a solution containing precursors of tin, iridium and ruthenium in the form of acetic solution containing SnHAC, IrHAC and RuHAC to the metal substrate with subsequent drying at 50-60° C. and thermal decomposition at 450-600° C. until reaching a noble metal loading, and upon reaching the total noble metal loading applying a final heat treatment at 500-550° C. for 20-200 minutes.

2. The electrode according to claim 1, wherein the noble metal loading of each layer of the catalytic coating expressed as the sum of iridium and ruthenium referred to the metals of the catalytic coating is 0.2 to 1.4 g/m².

3. The electrode according to claim 1, wherein the ratio Ir/Ru is 0.3 to 0.4 by weight referred to the metals of the catalytic coating.

4. The electrode according to claim 1, wherein said catalytic coating consists of a mixture consisting of 55-65% by weight of tin oxide, 15-20% by weight of iridium oxide and 20-25% by weight of ruthenium oxide referred to the metals of the catalytic coating.

5. A method for manufacturing an electrode according to claim 1 comprising the execution of the following sequential steps on a metal substrate:
    a) applying the acetic solution containing precursors of the components of said catalytic coating in the form of SnHAC, IrHAC and RuHAC to the metal substrate with subsequent drying at 50-60° C. and thermal decomposition at 450-600° C. until reaching a specific noble metal loading of 0.2 to 1.4 g/m²;
    b) repeating step a) until obtaining a catalytic coating with a specific noble metal loading of 2 to 25 g/m²; and
    c) finally heat treating at 500-550° C. for a time of 50 to 200 minutes.

6. The method according to claim 5 comprising an intermediate heat treatment at 500-550° C. for a time of 50 to 200 minutes carried out upon reaching the application of half the total loading of noble metal.

7. An electrolysis cell of alkali chloride solutions comprising an electrode according to claim 1 as chlorine-evolving anode.

* * * * *